US012560990B2

(12) United States Patent
Jenkins et al.

(10) Patent No.: US 12,560,990 B2
(45) Date of Patent: Feb. 24, 2026

(54) DYNAMIC POWER SUPPLY LOAD SPREADING TO OPTIMIZE OVERALL EFFICIENCY

(71) Applicant: International Business Machines Corporation, Armonk, NY (US)

(72) Inventors: Luke L. Jenkins, Poughkeepsie, NY (US); John S. Werner, Fishkill, NY (US); Arkadiy O. Tsfasman, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 93 days.

(21) Appl. No.: 18/484,796

(22) Filed: Oct. 11, 2023

(65) Prior Publication Data

US 2025/0123670 A1 Apr. 17, 2025

(51) Int. Cl.
| | |
|---|---|
| *G06F 1/30* | (2006.01) |
| *G06F 1/26* | (2006.01) |
| *G06F 1/28* | (2006.01) |
| *G06F 1/3296* | (2019.01) |
| *G06F 11/30* | (2006.01) |

(52) U.S. Cl.
CPC .............. *G06F 1/305* (2013.01); *G06F 1/26* (2013.01); *G06F 1/263* (2013.01); *G06F 1/28* (2013.01); *G06F 1/3296* (2013.01); *G06F 11/30* (2013.01)

(58) Field of Classification Search
CPC . G06F 1/26; G06F 1/28; G06F 1/3296; G06F 11/30
See application file for complete search history.

(56) References Cited

U.S. PATENT DOCUMENTS

| | | | | |
|---|---|---|---|---|
| 7,720,637 | B2 | 5/2010 | Brundridge | |
| 8,338,988 | B2 | 12/2012 | Togare | |
| 9,292,064 | B2 | 3/2016 | Grout et al. | |
| 9,658,665 | B2 | 5/2017 | Chapel et al. | |
| 9,996,128 | B2 | 6/2018 | Chapel et al. | |
| 10,496,145 | B2 | 12/2019 | Liang et al. | |
| 11,239,689 | B2 * | 2/2022 | Arduini | G06F 1/28 |
| 2009/0119064 | A1 | 5/2009 | Brundridge | |
| 2010/0264741 | A1 | 10/2010 | Togare | |
| 2011/0191618 | A1 * | 8/2011 | Berke | G06F 1/3296 |
| | | | | 713/340 |
| 2015/0082055 | A1 | 3/2015 | Grout et al. | |
| 2015/0149799 | A1 * | 5/2015 | Ye | G06N 7/02 |
| | | | | 713/320 |
| 2016/0195911 | A1 | 7/2016 | Chapel et al. | |
| 2016/0320818 | A1 * | 11/2016 | Huang | G06N 20/00 |
| 2016/0342186 | A1 * | 11/2016 | Ragupathi | G06F 1/189 |
| 2017/0346116 | A1 * | 11/2017 | Suzuki | H01M 16/003 |
| 2018/0101206 | A1 | 4/2018 | Chapel et al. | |

(Continued)

FOREIGN PATENT DOCUMENTS

WO 2018160232 A1 9/2018

*Primary Examiner* — Terrell S Johnson
(74) *Attorney, Agent, or Firm* — Patterson + Sheridan, LLP

(57) ABSTRACT

Method and apparatus for system power supply. A power demand of a system having a first power supply unit (PSU) and a second power supply unit (PSU) is monitored. An efficiency profile of the first PSU is accessed. An efficiency profile of the second PSU is accessed. A load split between the first and second PSUs is generated based on the efficiency profiles of the first and second PSUs and the power demand to increase a power efficiency of the system.

20 Claims, 6 Drawing Sheets

(56)     References Cited

U.S. PATENT DOCUMENTS

| | | |
|---|---|---|
| 2018/0164862 A1 | 6/2018 | Liang et al. |
| 2023/0273807 A1* | 8/2023 | Uppalapati ........... G06F 1/3206 |
| | | 718/1 |

* cited by examiner

100

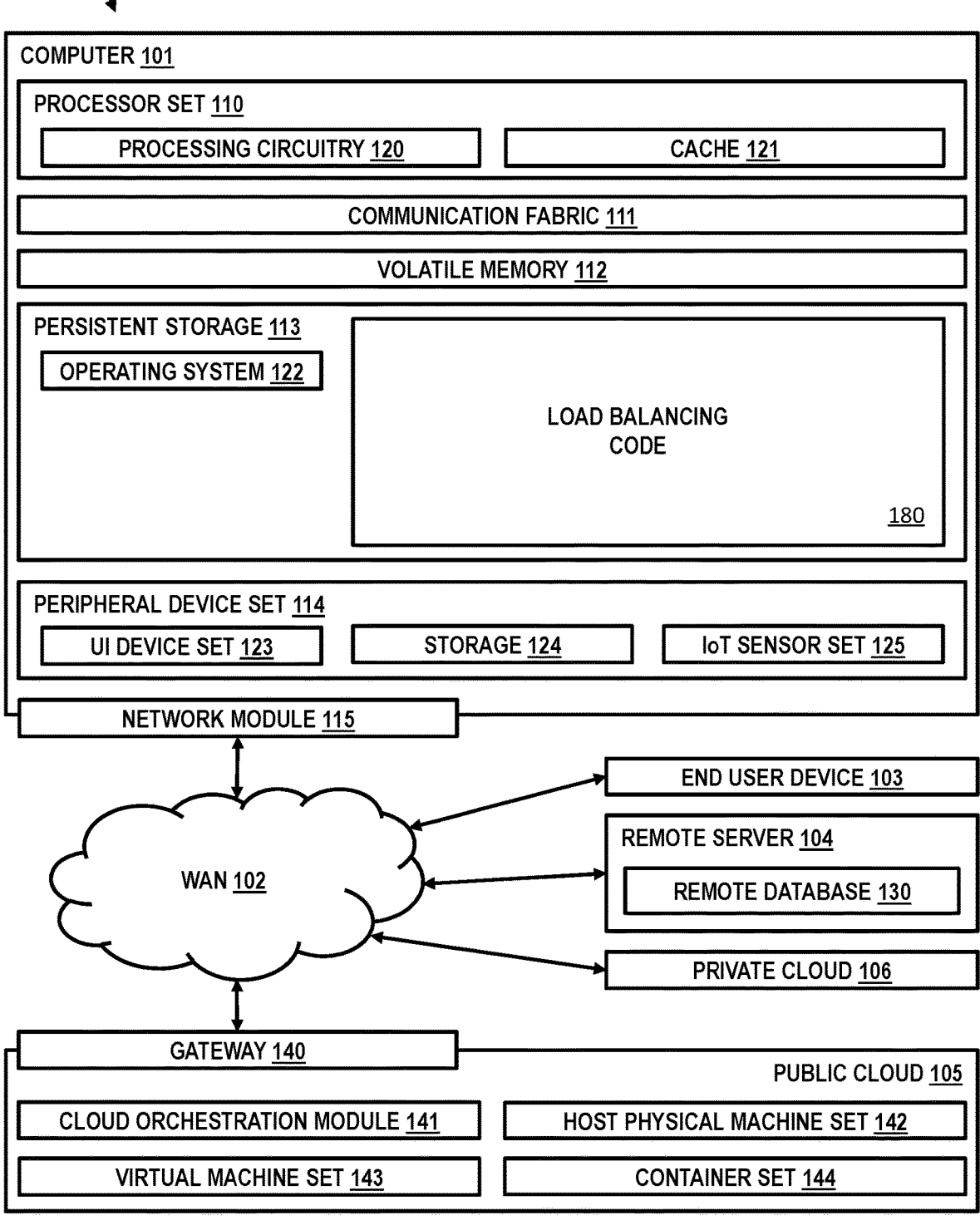

COMPUTER 101

PROCESSOR SET 110

PROCESSING CIRCUITRY 120 | CACHE 121

COMMUNICATION FABRIC 111

VOLATILE MEMORY 112

PERSISTENT STORAGE 113

OPERATING SYSTEM 122

LOAD BALANCING CODE

180

PERIPHERAL DEVICE SET 114

UI DEVICE SET 123 | STORAGE 124 | IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141 | HOST PHYSICAL MACHINE SET 142

VIRTUAL MACHINE SET 143 | CONTAINER SET 144

FIG. 1

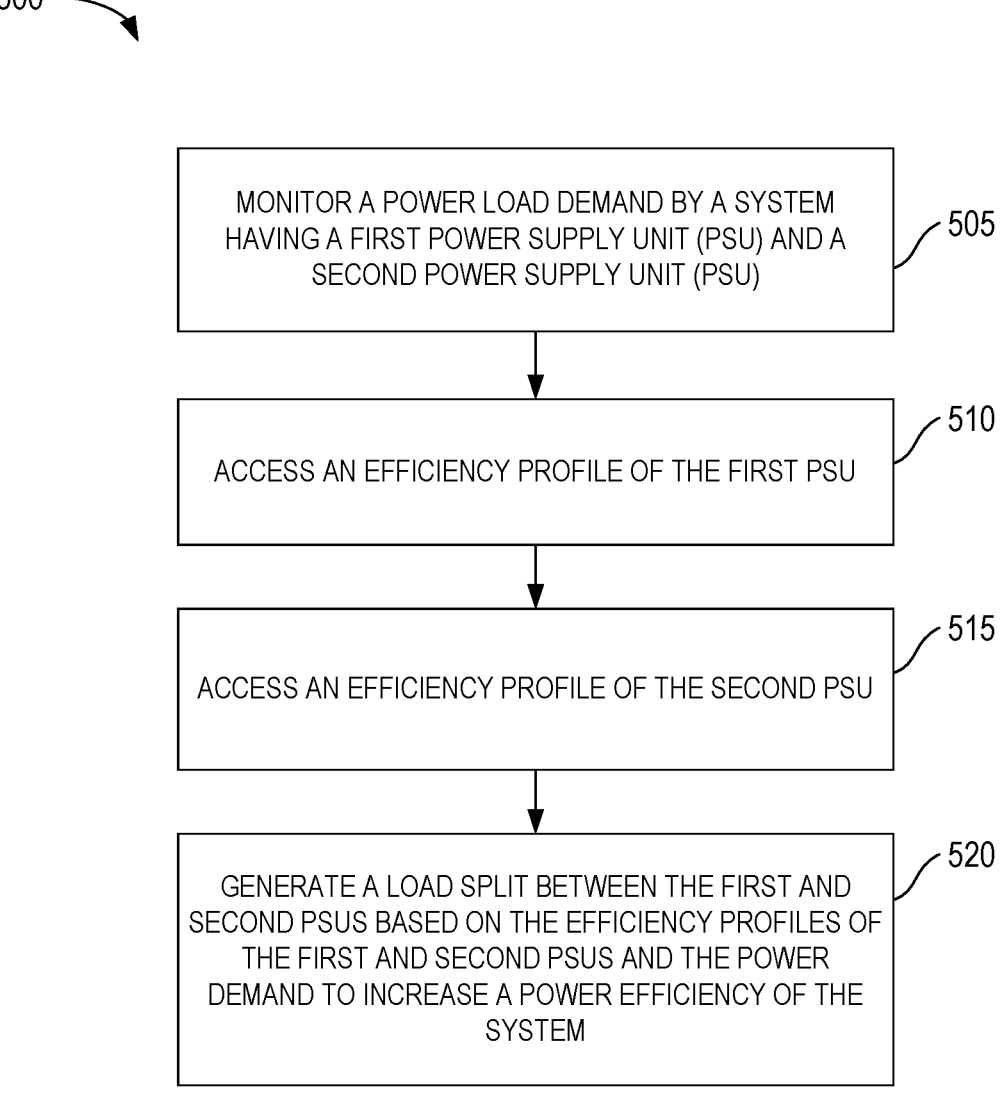

500

505

MONITOR A POWER LOAD DEMAND BY A SYSTEM
HAVING A FIRST POWER SUPPLY UNIT (PSU) AND A
SECOND POWER SUPPLY UNIT (PSU)

510

ACCESS AN EFFICIENCY PROFILE OF THE FIRST PSU

515

ACCESS AN EFFICIENCY PROFILE OF THE SECOND PSU

520

GENERATE A LOAD SPLIT BETWEEN THE FIRST AND
SECOND PSUS BASED ON THE EFFICIENCY PROFILES OF
THE FIRST AND SECOND PSUS AND THE POWER
DEMAND TO INCREASE A POWER EFFICIENCY OF THE
SYSTEM

*FIG. 5*

DYNAMIC POWER SUPPLY LOAD SPREADING TO OPTIMIZE OVERALL EFFICIENCY

BACKGROUND

The present disclosure relates to power supplies, and more specifically, to optimizing overall system efficiency by dynamically adjusting power load distribution across multiple power sources.

Some computer systems may operate with redundant power supplies. For example, a system may use multiple power supply units (PSUs), where the PSUs may be divided into categories (e.g., a primary category and a redundant category). Generally, the total rated capacity of the primary PSU(s) is equal to or larger than the system's power demand, with the redundant PSU(s) serving as backups. This configuration is designed to ensure uninterrupted operation of the computer system, even if one of its connected PSUs fails. Every PSU has an efficiency curve that demonstrates how its efficiency shifts with varying loads. Within this redundant power supply framework, the efficiency of PSUs varies, with some being more efficient than others. PSUs with lower efficiency tend to waste more power, particularly under light load conditions. This inefficiency arises because many PSUs are designed for optimal efficiency at medium to high loads, and when operated under light loads, they often function below their optimal efficiency, resulting in increased power consumption or waste.

To mitigate this inefficiency, some systems "phase-shed" or deactivate the lower efficiency power supplies to bring the higher efficiency power supplies closer to their peak efficiency. However, this approach compromises the redundancy of the design. Deactivating a PSU for efficiency reasons can risk system reliability, especially considering the delay involved in reactivating and stabilizing the turned-off PSU's output voltage. Therefore, phase shedding is not a practical option when maintaining redundancy is required.

SUMMARY

One embodiment presented in this disclosure provides a method, including monitoring a power demand of a system having a first power supply unit (PSU) and a second power supply unit (PSU), accessing an efficiency profile of the first PSU, accessing an efficiency profile of the second PSU, and generating a load split between the first and second PSUs based on the efficiency profiles of the first and second PSUs, and the power demand to increase a power efficiency of the system.

Other embodiments in this disclosure provide non-transitory computer-readable mediums containing computer program code that, when executed by operation of one or more computer processors, performs operations in accordance with one or more of the above methods, as well as systems comprising one or more computer processors and one or more memories containing one or more programs that, when executed by the one or more computer processors, perform an operation in accordance with one or more of the above methods.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

FIG. 1 depicts an example computing environment for the execution of at least some of the computer code involved in performing the inventive methods.

FIG. 5 depicts a flow diagram of an example method for load balancing control and optimization, according to some embodiments of the present disclosure.

To facilitate understanding, identical reference numerals have been used, where possible, to designate identical elements that are common to the figures. It is contemplated that elements disclosed in one embodiment may be beneficially used in other embodiments without specific recitation.

DETAILED DESCRIPTION

Figure 2:
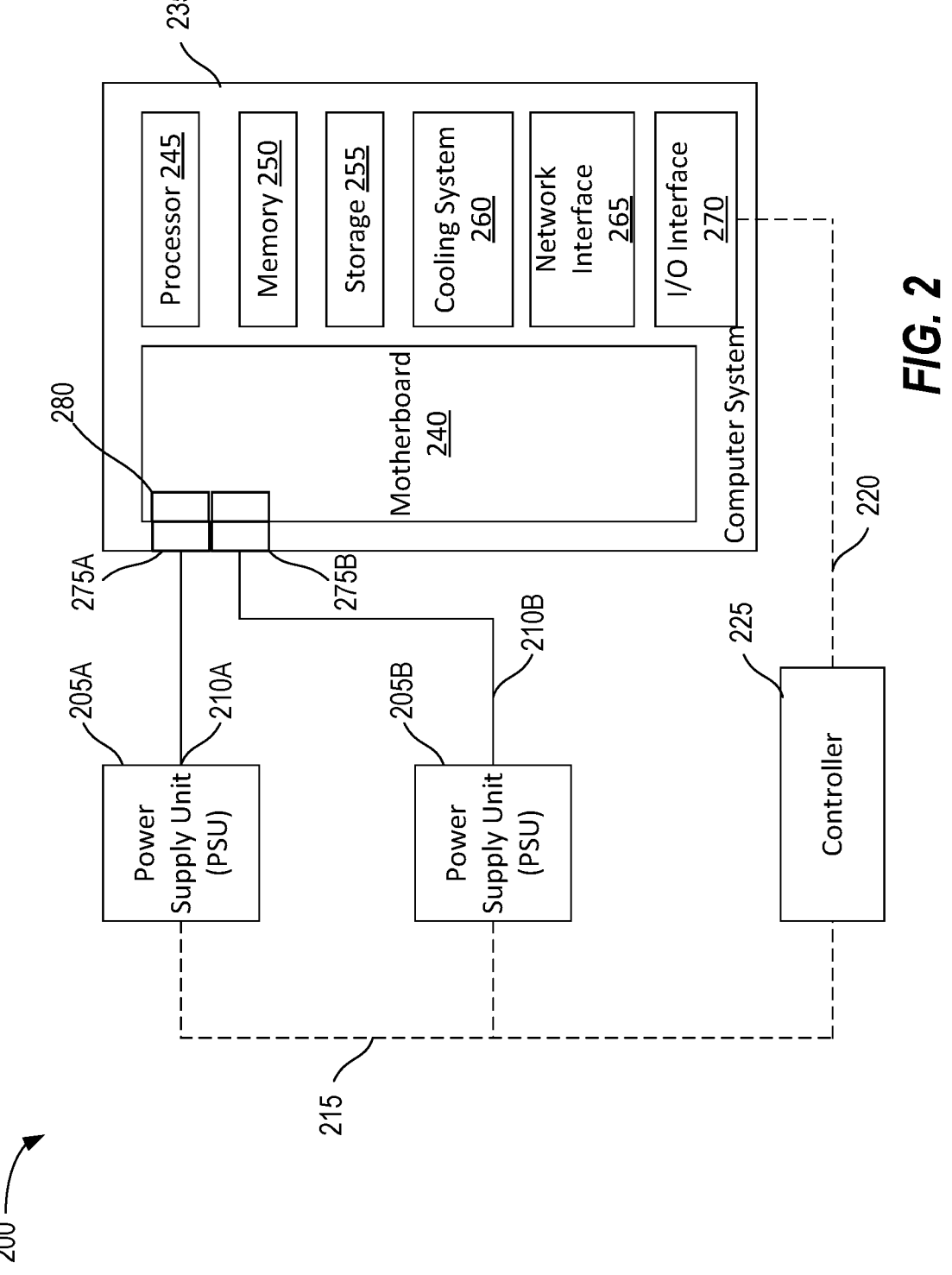
FIG. 2 depicts an example system 200 implemented with power efficiency improvements, according to some embodiments of the present disclosure.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments of the present disclosure provide techniques and methods to optimize power load distribution for computer systems with redundant power supplies. The disclosed techniques can improve the overall system efficiency by unbalancing the output load across multiple PSUs within the redundant power supplies of a system. For example, in one embodiment, the less efficient PSUs may be allocated a small percentage of the output load (causing them to operate lower on the efficiency curve), and the more efficient PSUs may be assigned a larger percentage of the output load (allowing them to operate closer to their peak efficiency). The distribution of output load for each PSU may be determined by a load balancing algorithm. By unbalancing the load across the PSUs, the disclosed method improves the overall system's efficiency. Additionally, by maintaining a minimum load on all PSUs, the disclosed method ensures that every PSU can recover quickly in the event of a failure, avoiding disturbances to the common output bus.

FIG. 1 depicts an example computing environment for the execution of at least some of the computer code involved in performing the inventive methods.

Computing environment 100 contains an example of an environment for the execution of at least some of the computer code involved in performing the inventive methods, such as Load Balancing Code 180. In addition to Load Balancing Code 180, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and Load Balancing Code 180, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in Load Balancing Code 180 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in Load Balancing Code 180 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

FIG. 2 depicts an example system 200 implemented with power efficiency improvements, according to some embodiments of the present disclosure.

In the illustrated example, the system 200 includes a computer system 235, a controller 225, and two power supply units (PSUs) 205A and 205B. In one embodiment, the PSU 205A may serve as the primary power source (also referred to in some embodiments as non-redundant power sources), with its rated capacity being equal to or exceeding the computer system's demand. PSU 205B, alternatively, may serve as the redundant power source and actively operate in parallel with PSU 205A to supply power to the computer system 235.

Although the illustrated example depicts two PSUs, the depicted example is only provided for conceptual clarity. In some embodiments, the computer system may connect to or use any number of PSUs (which may include N primary PSUs and R redundant PSUs). The number of, and capabilities of, the primary PSUs (also referred to in some embodiments as non-redundant PSUs) and the redundant PSUs may depend on the power demand and redundancy strategies (e.g., full redundancy, or partial redundancy) of the computer system 235.

In the illustrated example, each PSU 205 connects to the computer system 235 using one or more power connector 275. In some embodiments, the connector 275 may directly connect the PSUs 205 to the motherboard 240 of the computer system 235 with no cable. In some embodiments, as illustrated, the first PSU 205A may connect to the computer system 235 via a power connector 275A from which a power cable 210A extends, and the second PSU 205B may connect to the computer system 235 using a power connector 275B from which a power cable 210B extends. The power connectors 275A and 275B are designed to fit into one or more matching ports 280 on the motherboard 240, to allow a secure and efficient power distribution. Once connected, the power cables 210A and 210B transmit electrical power from the PSUs to various components within the computer system 235, such as the motherboard 240, the processor 245, the storage 255, the cooling system 260, the network interface 265, the I/O interface 270, and other peripheral devices drawing power from the motherboard. In the illustrated example, the power connector 275A and 275B directly plug into the motherboard 240 of the computer system 235. Upon connection, the motherboard 240 receives the electrical load from the PSUs 205 and subsequently distributes it to various components and sockets on the board. In some embodiments, such as when the computer system 235 has high-performance processors (e.g., CPU, or GPU), separate power connectors—with or without extending power cables—may be used. These connectors may plug directly into the respective CPU or GPU sockets on the motherboard 240. In some embodiments, separate power connectors may directly connect the PSUs 205 to other system components, such as the storage devices 255, and/or the cooling system 260.

In the illustrated example, the controller 225 (also referred to in some embodiments as the host controller) is communicably connected to the PSUs 205A and 205B via one or more communication links 215, as well as to the computer system via one or more communication links 220. Through these links 215 and 220, in some embodiments, the controller 225 may communicate with the PSUs 205 and the computer system 235. The location and integration of the controller 225 may vary depending on implementations of the computer system 235 and the PSUs 205. For example, in some embodiments, the controller 225 is integrated within the computer system 235 itself, acting as an internal component that monitors and manage power distribution. In other embodiments, the controller 225 may be embedded within one or more of the multiple PSUs 205. In other embodiments, the controller 225 may be designed as a discrete or standalone component, separate from both the computer system 235 and the PSUs 205. Additionally, the design and placement of the PSUs may differ based on the architecture and needs of the computer system 235. In some embodiments, the one or more PSUs 205 may be integral to or built into the computer system 235. Such compact designs may reduce the need for additional external hardware. In other embodiments, the PSUs 205 may function as external components, separate from the main computer system 235. By utilizing external PSUs, this configuration offers improved flexibility for future updates and maintenance.

In the illustrated example, the controller 225 may perform various operations to ensure stability and efficiency of the power supplies of computer system 235. For example, in some embodiments, the controller 225, via the communication links 215, may continuously monitor the status and health of each PSU (e.g., 205A, and 205B). In some embodiments, the controller 225 may retrieve and analyze the efficiency data of each PSU, if available. In some embodiments, the controller 225 may actively test and evaluate the efficiency of each PSU. For example, in some embodiments, the controller 225 may dynamically adjust the output load of each PSU (e.g., by altering the current draw from the PSU). By observing how each PSU responds to these adjustments, the controller may assess its efficiency across different load scenarios. In some embodiments, the efficiency of a PSU may be calculated by dividing the actual power delivered by the PSU (also referred to in some embodiments as PSU output) by the electrical power the PSU draws from the main sources (also referred to in some embodiments as PSU input). The result may then be multiplied by 100 to get a percentage. In some embodiments, based on the observed input and output values, the controller may generate an efficiency curve for each PSU across various load conditions. The efficiency curve for the PSUs may provide valuable information about the PSU's performance and may be used for further analyses regarding load distribution and power management.

In some embodiments, the controller 225 may monitor the current power demand of the computer system 235. In some embodiments, the controller 225 may monitor the power demand using sensors coupled to the power cables 210A and 210B. These sensors may measure the actual current and voltage being supplied from the PSUs to the computer system 235. In some embodiments, the motherboard 240 may include built-in sensors that monitor the real-time power consumption of the computer system 235. In such a configuration, the controller 225 may retrieve the power consumption data via the communication links 220 and use it to determine the power demand of the computer system 235.

In some embodiments, the controller 225 may adjust the output load distribution across the PSUs 205 to optimize efficiency. Specifically, the controller 225 may run load balancing algorithms to determine the weight of the output load for each PSU, considering the PSUs' varying efficiency curves and the current power demand. In some embodiments, the weight for each PSU may indicate the percentage of the total output power that each PSU should supply to collectively meet the demand of the computer system 235 and is determined to ensure that the overall system efficiency is improved. For example, the controller may adjust the load distribution (also referred to in some aspects as the load split) to an 80/20 ratio, where 80% of the load is directed to the PSUs with higher efficiency, and 20% of the load is allocated to the PSUs with lower efficiency. Although this adjustment may cause the efficiency of the less efficient PSUs to decrease, the efficiency of the entire system may increase compared to the original 50/50 load distribution ratio. More details are discussed below with reference to FIG. 3.

In some embodiments, after the load distribution is determined, the controller 225 may send commands to each PSU, instructing them to adjust their outputs in accordance with the decided load distribution. In some embodiments, the controller 225 may monitor any anomalies or issues with the PSUs. When a PSU fails, or exhibits irregular behavior (e.g., a sudden power surge or drop), the controller 225 may receive alerts or signals from the PSU. The controller 225, upon receiving the alerts, may take corrective actions (e.g., turning off the PSU, adjusting the load distribution, or activating another backup PSU).

In the illustrated example, the computer system 235 comprises one or more processors 245, one or more memories 250, one or more storages 255, a cooling system 260, one or more network interfaces 265, one or more I/O interfaces, and a motherboard 240. In some embodiments, the computer system 235 may correspond to any conventional computing device, such as laptops, desktops, tablets, smart phones, Internet-of-Things (IoT) sensors, servers, switches, and the like. In some embodiments, the processor 245 may retrieve and execute programming instructions stored in the memory 250, as well as store and retrieve application data residing in the storage 255. In some embodiments, the processor 245 may communicate with external networks, servers, or other devices via the network interfaces 265. In some embodiments, the processor 245 may interact with peripheral devices, such as keyboards, mice, printers, and external drives, via the I/O interfaces 270.

In some embodiments, the processor 245 may include various components, including central processing units (CPU), graphic processing units (GPU), among others. In some embodiments, the memory 250 may be any type of volatile or non-volatile memory, such as dynamic random access memory (RAM), static RAM, or read-only memory (ROM). In some embodiments, the storage 255 may include different types of storage devices, such as hard disk drives (HDD), solid-stated drives (SSD).

In some embodiments, the cooling system 260 may be used to dissipate the heat generated by the processor 245 and other components, to maintain optimal operational temperatures and stable performance of the computer system 235. Various mechanisms may be used for heat dissipation. For example, in some embodiments, the cooling system 260 may include fans to circulate air around components. In some embodiments, the cooling system 260 may include heat sinks (typically made of metal) to passively draw and spread heat-generating components (e.g., CPU, or GPU). In some embodiments, the cooling system 260 may include pumps (primarily in liquid cooling systems) to circulate coolant that absorbs and transfers heat away from heat-generating components (e.g., CPU, or GPU).

In some embodiments, the motherboard 240 may serve as the central hub, interfacing with all other components of the computer system 235. These components (e.g., CPU, GPU, RAM, or expansion cards) may be inserted into specific sockets or slots on the motherboard 240, in order to communicate with each other. In some embodiments, the motherboard 240 may directly connect to the power cables from PSUs, and be responsible for distributing power from the PSUs to these interconnected components (e.g., processor, memory, or storage) to ensure efficient operations.

Figure 3:
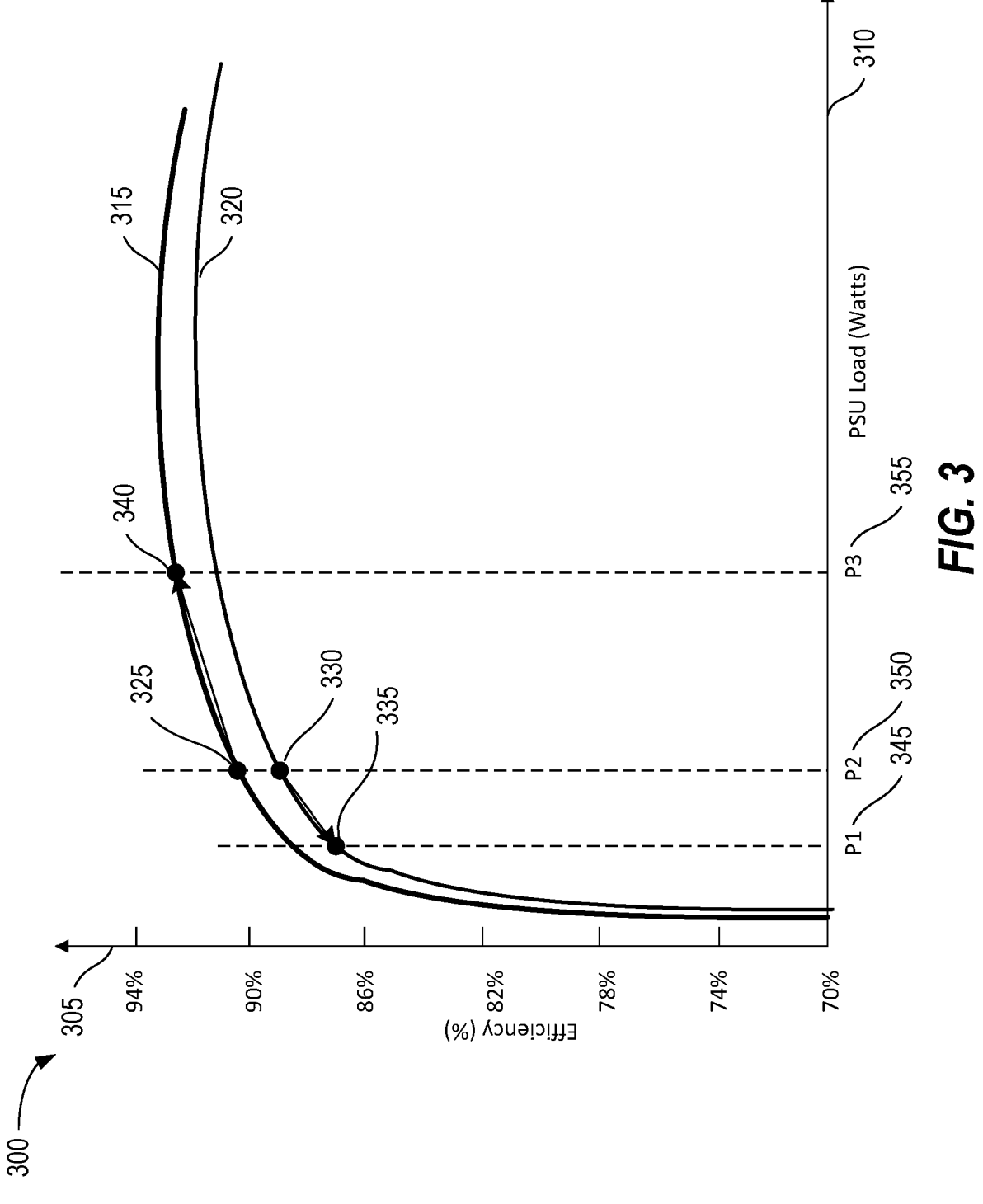
FIG. 3 depicts example efficiency curves for a plurality of power supply units (PSUs), according to some embodiments of the present disclosure.

FIG. 3 depicts example efficiency curves for a plurality of PSUs, according to some embodiments of the present disclosure.

In the illustrated graph 300, the horizontal axis 305 represents the power output (in watts) of each PSU, while the vertical axis 310 represents the efficiency percentage. Two efficiency curves are depicted in the graph 300. Efficiency curve 315 represents a first PSU (e.g., 205A of FIG. 2), and efficiency curve 320 represents a second PSU (e.g., 205B of FIG. 2). According to the illustrated graph, under a given output load P2 (e.g., indicated by the dashed line 350), the efficiency of the first PSU (e.g., indicated at point 325)

is approximately 90.5%, which is higher than the efficiency of the second PSU (e.g., which is approximately 89%, as indicated at point 330). The output load P2 (e.g., at line 350) represents a scenario where the load distribution between the first and second PSUs is evenly split (e.g., 50/50), with each PSU handling 50% of the system's total power demand.

In the illustrated graph 300, the load distribution may then be changed to an 80/20 load split, where the first PSU handles 80% of the system's power demand and the second PSU manages the remaining 20%. As a result of this change, the output load of the first PSU increases to P3 (e.g., as indicated by dashed line 355), causing the efficiency of the first PSU to increase from point 325 to point 340 (e.g., efficiency of the first PSU may increase from approximately 90.5% to approximately 93%). Conversely, the output load of the second PSU drops to P1 (e.g., indicated at dashed line 345) (since the second PSU now only handles 20% of the total power demand). Although the efficiency of the second PSU decreases from point 330 to point 335 (e.g., from approximately 89% to approximately 87%), its contribution to the total system load is also reduced compared with the previous load distribution (from 50% to 20%). Consequently, the overall efficiency of the system improves. The graph 300 indicates that strategic adjustments in load distribution, considering both the efficiencies of individual PSUs and the overall system's power demand, can lead to an improvement in the system's overall efficiency.

Figure 4:
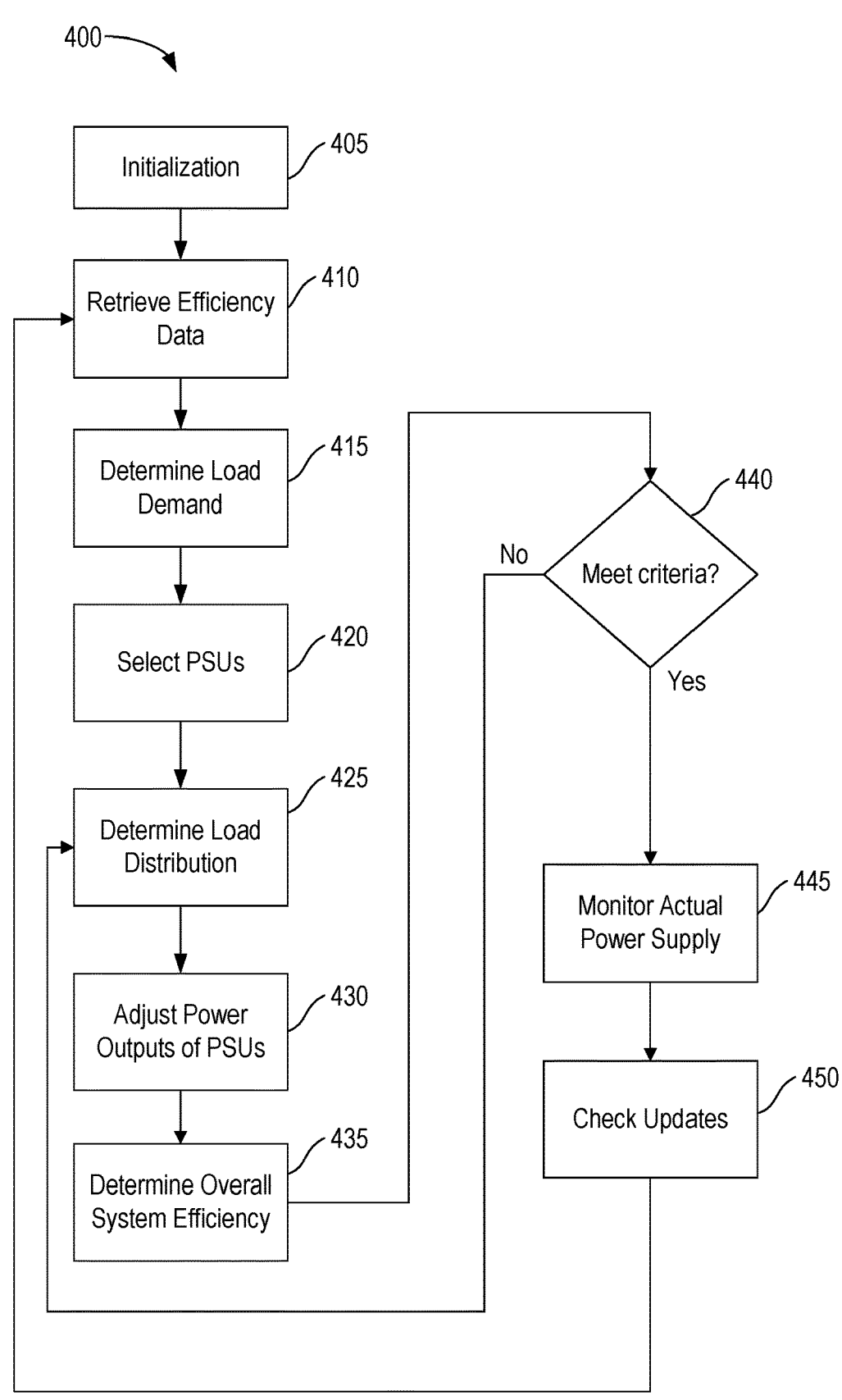
FIG. 4 depicts an example method for optimizing load distribution, according to some embodiments of the present disclosure.
Figure 6:
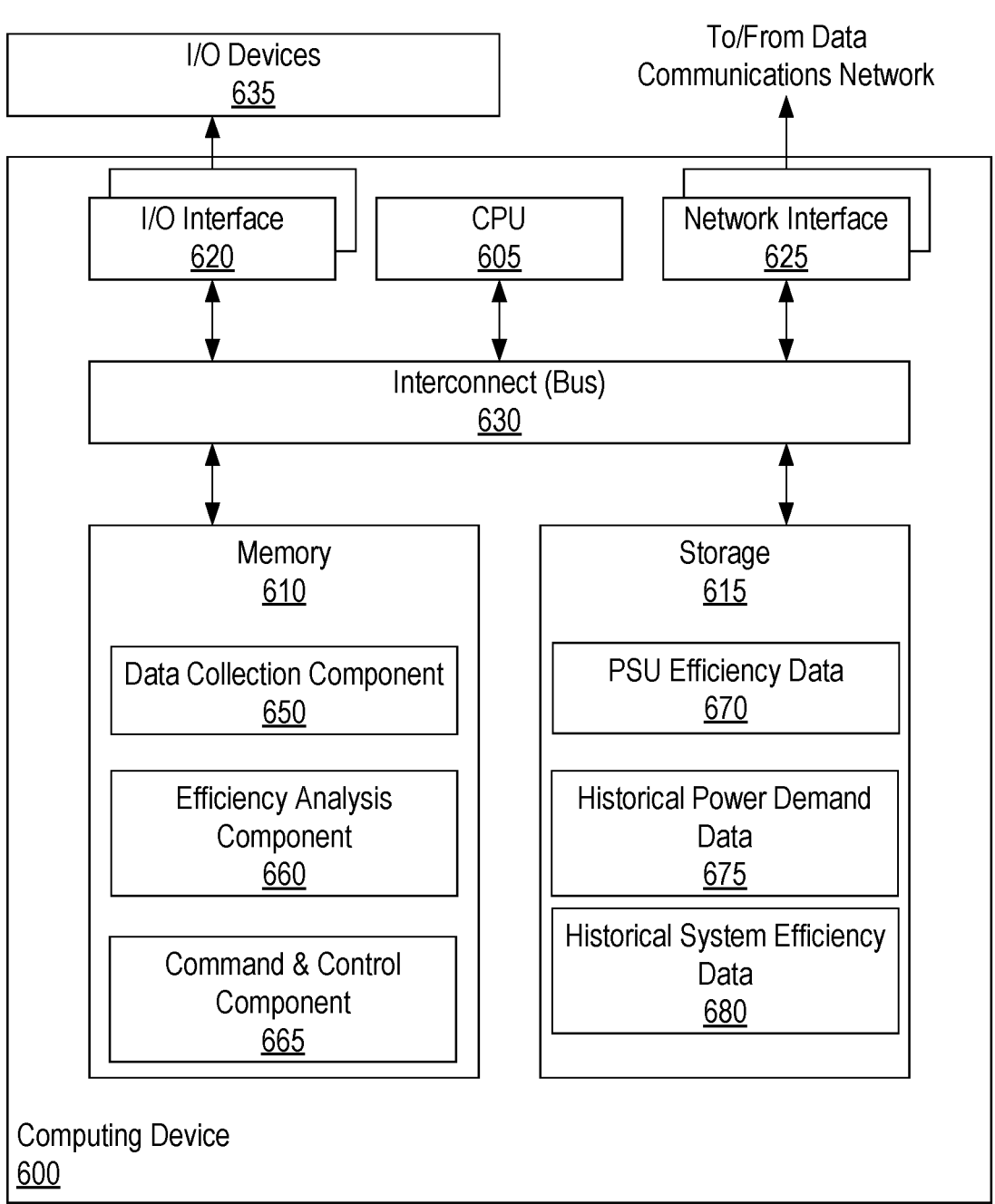
FIG. 6 depicts an example computing device for load balancing control and optimization, according to some embodiments of the present disclosure.

FIG. 4 depicts an example method 400 for optimizing load distribution, according to some embodiments of the present disclosure. In some embodiments, the method 400 may be performed by one or more computing devices, such as the computer 101 as illustrated in FIG. 1, the controller 225 as illustrated in FIG. 2, and/or the computing device 600 as illustrated in FIG. 6.

The method 400 begins at block 405, where a controller (e.g., 225 of FIG. 2) initiates connections to each PSU and determines the number of PSUs currently connected to the system.

At block 410, the controller retrieves efficiency data from each connected PSU. In some embodiments, the efficiency data may include the rated capacity of a PSU, its current status, and its efficiency curve (as depicted in FIG. 3). In some embodiments, the efficiency curve illustrates the efficiency of a PSU against different load levels. In some embodiments, the efficiency data may be stored in a database. The controller may establish a connection to the relevant database (via a network), authenticate itself if necessary, and retrieve the necessary efficiency data for each connected PSU. In some embodiments, the controller may undertake active tests to assess the efficiency of each PSU. This testing process may involve subjecting a PSU to various output loads (e.g., current draw from the PSU) and measuring its performance. The controller may then analyze the results to determine the efficiency curve of the PSU at different load levels.

At block 415, the controller determines the power demand of a host system (e.g., the computer system 235 of FIG. 2) that connects to the plurality of PSUs. In some embodiments, the controller may use sensors or power meters (e.g., coupled to power cables from PSUs to the host system) to measure the power (or current) drawn by the host system in real time. The controller may then determine the system's power demand based on the real-time data. In some embodiments, the computer system may itself have integrated sensors (e.g., installed on the motherboard) to monitor the power consumption of the host system. The controller may determine the system's power demand by retrieving data from the integrated sensor in real time. In some embodiments, when real-time data is not available (e.g., because the computer system hasn't initiated operations), the controller may retrieve historical power consumption data (e.g., from a database), analyze the patterns, and predict future power demands of the system. In some embodiments, predictions on power demands are made using various mechanisms, such as trained machine learning models.

At block 420, based on the determined power demand and redundancy strategy of the host system (e.g., computer system 235 of FIG. 2), along with the efficiency data for all connected PSUs, an appropriate number of PSUs is selected. The exact number of PSUs selected may vary depending on the redundancy strategy. For example, suppose an N+1 redundancy policy is used (which requires adding one redundant PSU), the host system current power demand is 1000 watts, and each PSU has a maximum capacity of 600 watts. In some embodiments, three PSUs may be selected for the host system. In such a configuration, two PSUs may function as the primary power sources (also referred to in some embodiments as non-redundant power sources) to cover the 1000 watts of power demand, and the third PSU may serve as a redundant backup. In some embodiments where a full redundancy strategy is utilized (which requires the redundant PSUs to have the combined capacity to take over the entire system load if all primary PSUs fail), with a power demand of 1000 watts and each PSU having a capacity of 600 watts, four PSUs may be selected: two for primary power needs and two as redundant power sources. In a partial redundancy setup that dedicates 50% redundancy to the power demand, when the current power demand is 1000 watts and each PSU capacity is 600 watts, the primary demand would still require two PSUs. For the redundant part, only one additional PSU would be sufficient. Therefore, under a partial redundancy strategy of 50%, the controller may select three PSUs: two for primary power needs and one as a redundant power source. In the above provided examples, the redundant PSUs do not remain in standby mode. Instead, the redundant PSUs actively work in parallel with the primary PSUs (also referred to in some embodiments as non-redundant PSUs) to supply power to the host system. For example, when four PSUs are selected for the host system, all four PSUs remain active, even though the host system only needs a minimum of two PSUs for normal operation (N-mode). In such configurations, the majority of the load may be assigned to the two primary PSUs (e.g., 800 watts of the 1000 watts load, 400 watts each), with the remaining load divided among the redundant PSUs (which may be less efficient) (e.g., 200 watts of the 1000 watts load, 100 watts each). In such configurations, no PSU in the system is completely powered off. Therefore, when any primary PSU (handling 400 watts of load) fails, the redundant PSUs do not require any additional time to enter the active state. Such configurations ensure a seamless and immediate switchover in the event that one of the PSUs encounters an issue or even becomes non-functional.

At block 425, the controller determines load distribution across the selected PSUs to optimize the overall system efficiency. In some embodiments, the controller may analyze the efficiency curves of the selected PSUs to determine which PSU(s) have higher efficiency than the other PSU(s). By evaluating these curves, along with the current power demand of the host system (e.g., computer system 235 of FIG. 2), the controller may adjust load distribution across the selected PSUs. In some embodiments, the controller may run a load balancing algorithm to determine the weight of the output load for each PSU, aiming to maximize (or at least increase) the overall system efficiency and ensure optimal (or at least improved) performance. For example, based on the analysis, the controller may adjust the load distribution (also referred to in some embodiments as the load split) by allocating a greater portion (or weight) of the load to the more efficient PSUs (e.g., increasing from 50% to 80%), and reducing the load on the less efficient PSUs (e.g., reducing from 50% to 20%).

In some embodiments, the overall system efficiency may be calculated as the ratio of power output (e.g., the amount of power that the system delivers to the host system) to total power input (e.g., the total power that the system draws from the source, such as an electrical grid). In some embodiments, when a system has multiple PSUs and a load distribution ratio is defined, the overall system efficiency may be a weighted average of the efficiencies of each PSU, based on the portion (or weight) of the total load each PSU is handling.

Various mechanisms may be used to determine the optimal (or at least improved) load distribution ratio (also referred to in some embodiments as the weights of output loads assigned to each PSU) to maximize (or at least increase) the overall system efficiency. For example, in some embodiments, the controller may adjust the output load of each PSU (e.g., by modulating the voltage applied to each PSU or altering the current each PSU delivers) and observe how the overall system efficiency responds to these adjustments. This iterative process may be repeated multiple times, with the controller making incremental adjustments until the system reaches its optimal efficiency. In some embodiments, unsupervised machine learning techniques (e.g., clustering) may be used to detect patterns and trends in the efficiency data, in order to identify the optimal (or at least improved) load distribution ratio.

For example, in some embodiments, the controller may first gather historical data on the system efficiency under various power demands and associated load distribution ratios. Utilizing the clustering algorithms, the controller may group the data based on similar performance patterns. For example, one cluster may capture data points where the system operates at peak efficiencies within a specific power demand range, while another cluster may capture data points where the system operates at reduced efficiencies within the same power demand range. These differences in efficiencies within the same power demand range are attributed to variations in load distribution ratios among the PSUs. As the analysis progresses, multiple such clusters may be generated, which together provide insights into the load distribution ratios that either enhance or reduce system efficiency under different power demand conditions. With this knowledge, when new PSUs are detected or the power load changes, the controller may predictively determine the load distribution ratio that is most likely to optimize system efficiency.

At block 430, after determining the optimal (or at least improved) load distribution ratio, the controller sends instructions to each active PSU. These instructions specify how each PSU should adjust its output to align with the determined load distribution. By following these instructions, each PSU may adjust its power delivery to match the portion (or weight) of the total system load it has been assigned. In some embodiments, the output of each PSU is adjusted by modulating the voltage applied to each PSU, which involves varying the voltage levels to either increase or decrease the power output. In some embodiments, the adjustment is achieved by altering the current that each PSU delivers. By adjusting the flow of current, a PSU may change its power output to meet the determined load distribution. In some embodiments, a minimum clip level of power output may be established for each active PSU. The clip level may represent the lowest power output that a PSU should maintain to ensure that, in the event of a failure of any other PSUs, the current PSU can compensate without causing disturbances to the common output bus.

At block 435, after the power outputs of selected PSUs have been adjusted in accordance with their respective assigned weights, the controller proceeds to determine the overall system efficiency. As discussed above, when a system has multiple PSUs and a load distribution ratio is defined, the overall system efficiency is a weighted average of the efficiencies of each PSU, based on the load distribution ratio (e.g., 80/20, or 50/50). In some embodiments, the controller may test the real-time efficiency of each PSU. It may then generate the overall system efficiency by aggregating each PSU's efficiency, considering the portion (or weight) of the total system load each PSU is handling.

At block 440, the controller determines whether the system efficiency meets one or more criteria. In some embodiments, the criteria may include determining whether the system is operating at optimal or peak efficiency. In some embodiments, the criteria may include determining whether the system efficiency surpasses a defined threshold (e.g., 90%).

If the efficiency does not satisfy these criteria, the method 400 returns to block 425, where the controller reinitiates the load balancing process, generating a new load distribution ratio that may yield better performance. This iterative process may lead the system towards the highest possible efficiency. To prevent infinite looping, in some embodiments, the iterative process may be performed up to a predefined threshold number of attempts (e.g., 5 times). If, after these attempts, the criteria are still not met, the controller may select the configuration with the best performance (e.g., highest overall system efficiency) from all the iterations.

If the efficiency has satisfied the criteria and is therefore deemed optimal, the method proceeds to block 445, where the controller continuously monitors the actual power outputs of the selected PSUs, to ensure they remain consistent with their assigned weights. In some embodiments, the controller may receive alerts or signals from a PSU when the PSU fails or exhibits irregular behavior. The controller, upon receiving these alerts, may take corrective actions (e.g., turning off the PSU, initiating another backup PSU) to protect the PSUs and prevent damage.

At block 450, the controller periodically checks for updates in the PSU efficiency data and monitors any changes in the system's power demand. The regular check ensures that the controller operates with the most updated information. When any shifts in the PSU efficiency data or changes in the system's power demand are detected, the method 400 loops back to block 410, from which the controller reinitiates the analysis process to determine an updated load distribution ratio in light of the observed changes. The iterative approach enables that the controller adjusts dynamically in response to the evolving power demand and PSU performance data, to ensure that the overall system efficiency consistently meets the defined criteria.

FIG. 5 depicts a flow diagram of an example method 500 for load balancing control and optimization, according to some embodiments of the present disclosure.

The method 500 begins at block 505, where a controlling device (e.g., 101 of FIG. 1, 225 of FIG. 2) monitors a power demand of a system (e.g., computer system 235 of FIG. 2)

having a first power supply unit (PSU) (e.g., 205A of FIG. 2) and a second power supply unit (PSU) (e.g., 205B of FIG. 2). In some embodiments, the first PSU may be a redundant PSU, and the second PSU may be a non-redundant PSU. In some embodiments, a rated capacity of the non-redundant PSU may be greater than or equal to a maximum anticipated power demand of the system.

At block 510, the controlling device accesses an efficiency profile of the first PSU (e.g., 315 of FIG. 3). In some embodiments, the efficiency profile of the first PSU may comprise a plurality of operational efficiencies of the first PSU, and each respective operational efficiency of the first PSU corresponds to a respective output load. In some embodiments, the efficiency profiles of the first and second PSUs may indicate that, for at least one output load (e.g., 350 of FIG. 3), an operational efficiency of the first PSU (e.g., 325 of FIG. 3) is higher than an operational efficiency of the second PSU (e.g., 330 of FIG. 3).

At block 515, the controlling device accesses an efficiency profile of the second PSU (e.g., 320 of FIG. 3).

At block 520, the controlling device generates a load split between the first and second PSUs based on the efficiency profiles of the first and second PSUs and the power demand to increase a power efficiency of the system. In some embodiments, the method 500 further comprises, upon detecting one or more changes within at least one of (i) the efficiency profile of the first PSU, (ii) the efficiency profile of the second PSU, or (iii) the power demand of the system, adjusting the load split between the first and second PSUs based on the one or more changes to increase the power efficiency of the system. In some embodiments, the process of determining the load split between the first and second PSUs based on the efficiency profiles of the first and second PSUs may comprise analyzing the efficiency profiles of the first and second PSUs, generating a first weight of load for the first PSU, and a second weight of load for the second PSU, using a power balancing algorithm, and adjusting power outputs of the first and second PSUs, in accordance with the generated first and second weights of load, based on the power demand of the system.

FIG. 6 depicts an example computing device 600 for load balancing control and optimization, according to some embodiments of the present disclosure. Although depicted as a physical device, in some embodiments, the computing device 600 may be implemented using virtual device(s), and/or across a number of devices (e.g., in a cloud environment). The computing device 600 can be embodied as any computing device, such as the computer 101 as illustrated in FIG. 1, and/or the controller 225 as illustrated in FIG. 2.

As illustrated, the computing device 600 includes a CPU 605, memory 610, storage 615, one or more network interfaces 625, and one or more I/O interfaces 620. In the illustrated embodiment, the CPU 605 retrieves and executes programming instructions stored in memory 610, as well as stores and retrieves application data residing in storage 615. The CPU 605 is generally representative of a single CPU and/or GPU, multiple CPUs and/or GPUs, a single CPU and/or GPU having multiple processing cores, and the like. The memory 610 is generally included to be representative of a random access memory. Storage 615 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O devices 635 (such as keyboards, monitors, etc.) are connected via the I/O interface(s)

620. Further, via the network interface 625, the computing device 600 can be communicatively coupled with one or more other devices and components (e.g., via a network, which may include the Internet, local network(s), and the like). As illustrated, the CPU 605, memory 610, storage 615, network interface(s) 625, and I/O interface(s) 620 are communicatively coupled by one or more buses 630.

In the illustrated embodiment, the memory 610 includes a data collection component 650, an efficiency analysis component 660, and a command & Control component 665.

Although depicted as a discrete component for conceptual clarity, in some embodiments, the operations of the depicted component (and others not illustrated) may be combined or distributed across any number of components. Further, although depicted as software residing in memory 610, in some embodiments, the operations of the depicted components (and others not illustrated) may be implemented using hardware, software, or a combination of hardware and software.

In one embodiment, the data collection component 650 may retrieve the efficiency data 670 of each connected PSU (from a remote database or local storage). In some embodiments, the efficiency data may include the rated capacity of a PSU, its current status, and its efficiency curve. The efficiency data illustrates the performance of a PSU under various output loads and is important in determining the load distribution ratio that maximizes (or at least improves) the overall system efficiency. In some embodiments, the data collection component 650 may monitor the power consumption of the host system (e.g., computer system 235 of FIG. 2) to determine its power demand in real time.

The efficiency analysis component 660 evaluates the efficiency of the entire system and its connected PSUs. In one embodiment, when the efficiency data of a connected PSU is unavailable or considered outdated, the efficiency analysis module 660 may initiate active testing of the PSU's efficiency. By adjusting the load conditions and monitoring the PSU's response, the efficiency analysis component 660 may generate an up-to-date efficiency curve for the PSU. In some embodiments, the efficiency analysis component 660 may select an appropriate number of PSUs for a host system (e.g., computer system 235 of FIG. 2) based on the determined power demand and redundancy strategy of the host system, along with the efficiency data for all connected PSUs. In some embodiments, using the efficiency data of the selected PSUs, combined with the current power demand of the host system, the efficiency analysis component 660 may run load balancing algorithms to find the load distribution ratio among the PSUs that maximizes (or at least improves) the overall system efficiency. In some embodiments, after the load distribution has been defined and each PSU's output load has been adjusted accordingly, the efficiency analysis component 660 may evaluate the real-time efficiency of each PSU and generate the overall system efficiency of the host system by aggregating these real-time efficiencies based on the portion (or weight) of the total system load each PSU is handling. In some embodiments, the efficiency analysis component 660 may compare the overall system efficiency with one or more defined criteria, to assess if the achieved efficiency is optimal or if further adjustments are required.

In one embodiment, the command & control component 665 may transmit commands to the PSUs, instructing them to adjust their output loads in accordance with the determined load distribution ratio. In some embodiments, the command & control component 665 may monitor feedback or alerts from the PSUs, to ensure each PSU is operating as instructed. In some embodiments, when a PSU fails or exhibits irregular behaviors, and/or there are risks of overloads, the command & control component 665 may activate necessary actions to protect the system and prevent damage (e.g., turning off the PSU, adjusting the load distribution, or activating another backup PSU).

In the illustrated example, the storage 615 may include PSU efficiency data 670, historical power demand data 675, and historical system efficiency data 680. In some embodiments, the aforementioned information may be saved in a remote database that connects to the computing device 600 via a network.

In the preceding, reference is made to embodiments presented in this disclosure. However, the scope of the present disclosure is not limited to specific described embodiments. Instead, any combination of the features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

While the foregoing is directed to embodiments of the present invention, other and further embodiments of the invention may be devised without departing from the basic scope thereof, and the scope thereof is determined by the claims that follow.

What is claimed is:

1. A method comprising:
   determining a power demand of a system having a first power supply unit (PSU) and a second power supply unit (PSU), comprising:
      retrieving historical consumption data associated with the system, and
      predicting the power demand of the system based on the historical consumption data using a trained machine learning (ML) model;
   accessing an efficiency profile of the first PSU;
   accessing an efficiency profile of the second PSU; and
   generating a load split between the first and second PSUs based on the efficiency profiles of the first and second PSUs and the power demand to increase a power efficiency of the system, comprising:
      determining a first weight assigned to the first PSU and a second weight assigned to the second PSU, each weight corresponding to a portion of the power demand to be carried by the respective PSU and being determined using a clustering algorithm that analyzes historical load distribution data.

2. The method of claim 1, wherein the efficiency profile of the first PSU comprises a plurality of operational efficiencies of the first PSU, and each respective operational efficiency of the first PSU corresponds to a respective output load.

3. The method of claim 1, further comprising, upon detecting one or more changes within at least one of (i) the efficiency profile of the first PSU, (ii) the efficiency profile of the second PSU, or (iii) the power demand of the system, adjusting the load split between the first and second PSUs based on the one or more changes to increase the power efficiency of the system.

4. The method of claim 1, wherein the efficiency profiles of the first and second PSUs indicate that, for at least one output load, an operational efficiency of the first PSU is higher than an operational efficiency of the second PSU.

5. The method of claim 1, wherein the first PSU is a redundant PSU, and the second PSU is a non-redundant PSU.

6. The method of claim 5, wherein a rated capacity of the non-redundant PSU is greater than or equal to a maximum anticipated power demand of the system.

7. The method of claim 1, wherein determining the first weight and the second weight using the clustering algorithm comprises:
   grouping the historical load distribution data into clusters based on similar performance patterns of the system,
   identifying a first cluster corresponding to data points at which the system operates at peak efficiencies within a specified power demand range and a second cluster corresponding to data points at which the system operates at reduced efficiencies within the specified power demand range,
   detecting differences in efficiency within the specified power demand range by comparing the first and second clusters,
   attributing the differences to one or more other power demand ranges of the system, and
   generating the first and second weights for the load split based on the first and second clusters and the predicted power demand of the system.

8. A system comprising:
   one or more memories collectively storing computer-executable instructions; and
   one or more processors configured to collectively execute the computer-executable instructions and cause the system to:
      determine a power demand of a system having a first power supply unit (PSU) and a second power supply unit (PSU), comprising:
         retrieving historical consumption data associated with the system, and
         predicting the power demand of the system based on the historical consumption data using a trained machine learning (ML) model;
      access an efficiency profile of the first PSU;
      access an efficiency profile of the second PSU; and
      generate a load split between the first and second PSUs based on the efficiency profiles of the first and second PSUs and the power demand to increase a power efficiency of the system, comprising:
         determining a first weight assigned to the first PSU and a second weight assigned to the second PSU, each weight corresponding to a portion of the power demand to be carried by the respective PSU and being determined using a clustering algorithm that analyzes historical load distribution data.

9. The system of claim 8, wherein the efficiency profile of the first PSU comprises a plurality of operational efficiencies of the first PSU, and each respective operational efficiency of the first PSU corresponds to a respective output load.

10. The system of claim 8, wherein the computer-executable instructions are executed by the one or more processors and cause the system to further, upon detecting one or more changes within at least one of (i) the efficiency profile of the first PSU, (ii) the efficiency profile of the second PSU, or (iii) the power demand of the system, adjust the load split between the first and second PSUs based on the one or more changes to increase the power efficiency of the system.

11. The system of claim 8, wherein the efficiency profiles of the first and second PSUs indicate that, for at least one output load, an operational efficiency of the first PSU is higher than an operational efficiency of the second PSU.

12. The system of claim 8, wherein the first PSU is a redundant PSU, and the second PSU is a non-redundant PSU.

13. The system of claim 12, wherein a rated capacity of the non-redundant PSU is greater than or equal to a maximum anticipated power demand of the system.

14. The system of claim 8, wherein determining the first weight and the second weight using the clustering algorithm comprises:

grouping the historical load distribution data into clusters based on similar performance patterns of the system, identifying a first cluster corresponding to data points at which the system operates at peak efficiencies within a specified power demand range and a second cluster corresponding to data points at which the system operates at reduced efficiencies within the specified power demand range, detecting differences in efficiency within the specified power demand range by comparing the first and second clusters, attributing the differences to one or more other power demand ranges of the system, and generating the first and second weights for the load split based on the first and second clusters and the predicted power demand of the system.

15. A host controller, comprising:

a computer-readable storage medium having computer-readable program code executable to cause the host controller to:

determine a power demand of a system having a first power supply unit (PSU) and a second power supply unit (PSU), comprising:

retrieving historical consumption data associated with the system, and predicting the power demand of the system based on the historical consumption data using a trained machine learning (ML) model;

access an efficiency profile of the first PSU;

access an efficiency profile of the second PSU; and generate a load split between the first and second PSUs based on the efficiency profiles of the first and second PSUs and the power demand to increase a power efficiency of the system, comprising:

determining a first weight assigned to the first PSU and a second weight assigned to the second PSU, each weight corresponding to a portion of the power demand to be carried by the respective PSU and being determined using a clustering algorithm that analyzes historical load distribution data; and one or more processors, each processor of which is configured to execute at least a respective portion of the computer-readable program code.

16. The host controller of claim 15, wherein the efficiency profile of the first PSU comprises a plurality of operational efficiencies of the first PSU, and each respective operational efficiency of the first PSU corresponds to a respective output load.

17. The host controller of claim 15, wherein the computer-readable storage medium having computer-readable program code executable to cause the host controller to further, upon detecting one or more changes within at least one of (i) the efficiency profile of the first PSU, (ii) the efficiency profile of the second PSU, or (iii) the power demand of the system, adjust the load split between the first and second PSUs based on the one or more changes to increase the power efficiency of the system.

18. The host controller of claim 15, wherein the efficiency profiles of the first and second PSUs indicate that, for at least one output load, an operational efficiency of the first PSU is higher than an operational efficiency of the second PSU.

19. The host controller of claim 15, wherein the first PSU is a redundant PSU, the second PSU is a non-redundant PSU, and a rated capacity of the non-redundant PSU is greater than or equal to a maximum anticipated power demand of the system.

20. The host controller of claim 16, wherein determining the first weight and the second weight using the clustering algorithm comprises:

grouping the historical load distribution data into clusters based on similar performance patterns of the system, identifying a first cluster corresponding to data points at which the system operates at peak efficiencies within a specified power demand range and a second cluster corresponding to data points at which the system operates at reduced efficiencies within the specified power demand range, detecting differences in efficiency within the specified power demand range by comparing the first and second clusters, attributing the differences to one or more other power demand ranges of the system, and generating the first and second weights for the load split based on the first and second clusters and the predicted power demand of the system.

\* \* \* \* \*